(12) United States Patent
Navratil (10) Patent No.: US 9,916,935 B2
(45) Date of Patent: Mar. 13, 2018

(54) SOLID ELECTROLYTIC CAPACITOR WITH INCREASED VOLUMETRIC EFFICIENCY

(71) Applicant: AVX Corporation, Fountain Inn, SC (US)

(72) Inventor: Jiri Navratil, Lanskroun (CZ)

(73) Assignee: AVX Corporation, Fountain Inn, SC (US)

(*) Notice: Subject to any disclaimer, the term of this patent is extended or adjusted under 35 U.S.C. 154(b) by 161 days.

(21) Appl. No.: 14/535,412

(22) Filed: Nov. 7, 2014

(65) Prior Publication Data

US 2016/0133391 A1    May 12, 2016

(51) Int. Cl.
| | |
|---|---|
| *H01G 9/052* | (2006.01) |
| *H01G 9/15* | (2006.01) |
| *H01G 9/025* | (2006.01) |
| *H01G 9/00* | (2006.01) |
| *H01G 9/08* | (2006.01) |
| *H01G 9/26* | (2006.01) |

(52) U.S. Cl.
CPC ........... *H01G 9/052* (2013.01); *H01G 9/0029* (2013.01); *H01G 9/08* (2013.01); *H01G 9/15* (2013.01); *H01G 9/26* (2013.01); *H01G 9/025* (2013.01)

(58) Field of Classification Search
CPC .......... H01G 9/052; H01G 9/042; H01G 9/15; H01G 9/025; H01G 9/0029; H01G 9/08; H01G 9/26
See application file for complete search history.

(56) References Cited

U.S. PATENT DOCUMENTS

| | | | |
|---|---|---|---|
| 3,345,545 A | | 10/1967 | Bourgault et al. |
| 3,611,055 A | * | 10/1971 | Zeppieri ................. H01G 9/08 29/25.03 |
| 4,064,611 A | * | 12/1977 | Sobozenski ............ H01G 9/012 29/25.03 |

(Continued)

FOREIGN PATENT DOCUMENTS

| | | | |
|---|---|---|---|
| JP | 2004253501 A | * | 9/2004 |
| JP | 2005033097 A | * | 2/2005 |

(Continued)

OTHER PUBLICATIONS

Related U.S. Patent Application Form.

*Primary Examiner* — David M Sinclair
(74) *Attorney, Agent, or Firm* — Dority & Manning, P.A.

(57) ABSTRACT

A solid electrolytic capacitor that contains a capacitor element including an anode body, a dielectric layer, and solid electrolyte is provided. The capacitor element also includes an anode lead (e.g., wire, tape, etc.) that is electrically connected to the anode body. A first portion of the anode lead is embedded within the anode body, while a second portion of the anode lead extends from the anode body in a longitudinal direction. Contrary to conventional capacitors in which the exposed portion of the anode lead is supported by a complex and bulky lead frame assembly, there is no lead frame present in the capacitor of the present disclosure. Thus, the volumetric efficiency of the finished capacitor can be increased. An assembly containing a matrix of multiple solid electrolytic capacitor elements is also provided, as is a method for forming a matrix that comprises multiple solid electrolytic capacitor elements.

10 Claims, 6 Drawing Sheets

(56) References Cited

U.S. PATENT DOCUMENTS

| | | | |
|---|---|---|---|
| 4,247,883 A * | 1/1981 | Thompson | H01G 9/012 361/306.1 |
| 4,562,514 A * | 12/1985 | Sansa | H01G 9/012 29/25.03 |
| 4,688,322 A * | 8/1987 | Fossey | H01G 9/08 29/25.03 |
| 4,945,452 A | 7/1990 | Sturmer et al. | |
| 5,111,327 A | 5/1992 | Blohm et al. | |
| 5,357,399 A | 10/1994 | Salisbury | |
| 5,457,862 A | 10/1995 | Sakata et al. | |
| 5,473,503 A | 12/1995 | Sakata et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,214,060 B1 * | 4/2001 | Kuriyama | H01G 9/15 29/25.03 |
| 6,238,444 B1 | 5/2001 | Cadwallader | |
| 6,322,912 B1 | 11/2001 | Fife | |
| 6,380,577 B1 | 4/2002 | Cadwallader | |
| 6,391,275 B1 | 5/2002 | Fife | |
| 6,392,869 B2 * | 5/2002 | Shiraishi | H01G 9/012 361/523 |
| 6,400,556 B1 * | 6/2002 | Masuda | H01G 9/15 361/311 |
| 6,416,730 B1 | 7/2002 | Fife | |
| 6,527,937 B2 | 3/2003 | Fife | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,813,140 B1 | 11/2004 | Huntington | |
| 6,987,663 B2 | 1/2006 | Merker et al. | |
| 7,116,548 B2 | 10/2006 | Satterfield, Jr. et al. | |
| 7,220,397 B2 | 5/2007 | Kimmel et al. | |
| 7,262,511 B2 | 8/2007 | Osako et al. | |
| 7,323,395 B2 | 1/2008 | Huntington | |
| 7,341,705 B2 | 3/2008 | Schnitter | |
| 7,381,396 B2 | 6/2008 | Thomas et al. | |
| 7,419,926 B2 | 9/2008 | Schnitter et al. | |
| 7,515,396 B2 | 4/2009 | Biler | |
| 7,687,884 B2 | 3/2010 | Huntington | |
| 8,313,538 B2 | 11/2012 | Merker et al. | |
| 2002/0015279 A1 * | 2/2002 | Sakai | H01G 9/0036 361/523 |
| 2003/0026064 A1 * | 2/2003 | Nakada | H01G 9/012 361/523 |
| 2004/0160729 A1 * | 8/2004 | Kochi | H01G 9/025 361/528 |
| 2005/0105248 A1 * | 5/2005 | Oh | H01G 2/065 361/523 |
| 2008/0106852 A1 * | 5/2008 | Amita | H01G 9/042 361/528 |
| 2008/0247122 A1 * | 10/2008 | Vaisman | H01G 2/065 361/533 |
| 2008/0259528 A1 * | 10/2008 | Fujita | H01G 9/012 361/528 |
| 2010/0165547 A1 * | 7/2010 | Kuranuki | H01G 9/012 361/525 |

FOREIGN PATENT DOCUMENTS

| | | | |
|---|---|---|---|
| JP | 2010245406 A * | 10/2010 | |
| WO | WO 2006105766 A1 * | 10/2006 | H01G 9/012 |

* cited by examiner

SOLID ELECTROLYTIC CAPACITOR WITH INCREASED VOLUMETRIC EFFICIENCY

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a metal lead wire, sintering the pressed part, anodizing the sintered anode, and thereafter applying a solid electrolyte. The resulting capacitor element contains an anode lead wire that extends outwardly from the anode body and is welded at its end to an anode termination. The high surface area of the metal powder within the sintered anode has enabled the development of solid electrolytic capacitors to be produced that have a relatively small volume. However, a complex and bulky anode lead frame assembly is often required to support the portion of the anode lead that extends from the sintered anode body. Such a lead frame assembly reduces the compactness of the resulting capacitor, and the increased volumetric efficiency achieved by the large surface area of metal within the sintered anode is thus counteracted by the bulkiness of the conventional anode lead frame assembly. Therefore, a need for an increase in the volumetric efficiency of a solid electrolytic capacitor element still remains. Further, a need also exists for an increase in the volumetric efficiency and capacitance of a solid electrolytic capacitor assembly containing multiple solid electrolytic capacitor elements.

SUMMARY OF THE INVENTION

In accordance with one embodiment of the present invention, a solid electrolytic capacitor is disclosed. The solid electrolytic capacitor includes a capacitor body, a metal plate, and an anode lead. The capacitor body includes a sintered, porous anode body; a dielectric layer overlying at least a portion of the porous anode body; and a cathode overlying at least a portion of the dielectric layer, where the cathode includes a solid electrolyte. The metal plate is electrically connected to the solid electrolyte via a conductive adhesive at a first surface of the capacitor body. Meanwhile, a first portion of the anode lead is embedded within the porous anode body and a second portion of the anode lead extends from an opposing second surface of the capacitor body in a longitudinal direction.

In another embodiment, the present disclosure is directed to a solid electrolytic capacitor assembly that comprises a matrix of multiple solid electrolytic capacitor elements. Each of the multiple solid electrolytic capacitor elements includes a capacitor body that has a first surface and an opposing second surface, where the capacitor body includes a sintered, porous anode body, a dielectric layer overlying at least a portion of the porous anode body, and a cathode overlying at least a portion of the dielectric layer, where the cathode includes a solid electrolyte. Each of the multiple solid electrolytic capacitor elements also includes an anode lead, where a first portion of the anode lead is embedded within the porous anode body and a second portion of the anode lead extends from the second surface of the capacitor body in a longitudinal direction.

In yet another embodiment, the present disclosure is directed to a method for forming a matrix comprising multiple solid electrolytic capacitor elements. The method includes forming the multiple solid electrolytic capacitor elements, where each solid electrolytic capacitor element includes an anode lead and a capacitor body having an upper surface and a lower surface, by embedding the anode lead within a powder formed from a valve metal composition, compacting the powder around the anode lead, and sintering the compacted powder and the anode lead to form a sintered, porous anode body, where a first portion of the anode lead is embedded within the porous anode body and a second portion of the anode lead extends from the upper surface of the porous anode body in a longitudinal direction. The capacitor elements are formed by anodically oxidizing the sintered, porous anode body to form a dielectric layer, and applying a solid electrolyte to the anodically oxidized, sintered, porous anode body to form the capacitor body. After the multiple solid electrolytic capacitor elements are formed, the method further includes positioning the lower surface of each capacitor body on a metal plate, and dispensing an insulating material around the multiple solid electrolytic capacitor elements to form an insulating layer, wherein a segment of the second portion of each of the anode leads extends beyond an exterior surface the insulating layer.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor containing a capacitor element that includes a porous anode body, a dielectric layer, and a solid electrolyte, which collectively form a capacitor body, as well as an anode lead (e.g., wire, tape, etc.) that is electrically connected to the porous anode body. The anode lead includes a first portion that is embedded within the anode body and a second portion that extends from a second surface of the capacitor body in a longitudinal direction. The capacitor also contains a metal plate (i.e., bottom lid) that is electrically connected to the solid electrolyte of the capacitor body at a first surface of the capacitor body. The capacitor also includes an insulating material can be disposed around the capacitor element so that part of the capacitor body and part of the second portion of the anode lead are surrounded by an insulating layer. However, it is to be understood that a part of the second portion of the anode lead, such as the tip, remains exposed at an exterior surface of the insulating layer and can be substantially flush with the exterior surface of the insulating layer such that it is free from contact with the insulating layer so that it can be in contact with one or more conductive layers that serve as an anode termination. This configuration can enhance the volumetric efficiency, increase the capacitance, and decrease the ESR of the solid electrolytic capacitor of the present invention when compared to other solid electrolytic capacitors utilizing complex lead frames. Without intending to be limited by any particular theory, it is believed that the metal plate can act as in intermediary to enhance the surface smoothness of the capacitor element such that a better electrical connection can be formed between the capacitor element and any plating layers or terminations that might be applied thereto.

In yet another embodiment, the present invention is directed to a solid electrolytic capacitor assembly that comprises a matrix of multiple solid electrolytic capacitor elements. Each of the multiple solid electrolytic capacitor elements comprises a capacitor body and an anode lead. The capacitor body comprises a sintered, porous anode body, a dielectric layer overlying at least a portion of the porous anode body, and a cathode overlying at least a portion of the dielectric layer. Further, the cathode includes a solid electrolyte. Although not required, a metal plate can be electrically connected to the solid electrolyte of each of the multiple solid electrolytic capacitor elements at a first surface of each of the capacitor bodies via a conductive adhesive to improve the electrical connection between the capacitor element and any plating layers or terminations that might be applied thereto. Each of the multiple solid electrolytic capacitor elements further comprises an anode lead. For each element, a first portion of the anode lead is embedded within the porous anode body and a second portion of the anode lead extends from a second surface of the capacitor body in a longitudinal direction. An insulating material can be disposed around each capacitor element so that part of the capacitor body and part of the second portion of each anode lead are surrounded by an insulating layer. However, it is to be understood that a part of the second portion of the anode lead, such as the tip, remains exposed or free from contact with the insulating layer and can be trimmed such that it is substantially flush with an exterior surface of the insulating layer. This configuration can enhance the volumetric efficiency, increase the capacitance, and decrease the ESR of the solid electrolytic capacitor assembly of the present invention when compared to other solid electrolytic capacitor assemblies utilizing complex lead frames, and such a configuration can be incorporated in such devices as solid state drive (SSD) or subscriber identity module (SIM) cards. The solid electrolyte capacitor assembly further comprises an anode termination (e.g., one or more conductive layers of titanium, chromium/nickel, nickel, silver, or a combination thereof) that is electrically connected to the anode lead of each of the multiple capacitor elements, while the metal plate can serve as the cathode termination that is electrically connected to the solid electrolyte. The anode leads can be connected to the anode termination and the solid electrolyte can be connected to the cathode termination via the conductive adhesive discussed above or via any suitable manner such as spot welding or laser welding.

Regardless of whether the multiple solid electrolytic capacitor elements described above are maintained in a matrix arrangement to form a solid electrolytic capacitor assembly or whether the multiple solid electrolytic capacitor elements are separated to form individual solid electrolytic capacitors, the porous anode body or bodies may be formed from a valve metal composition having a high specific charge, such as about 40,000 µF*V/g or more, in some embodiments about 50,000 µF*V/g or more, in some embodiments about 60,000 µF*V/g or more, and in some embodiments, from about 70,000 to about 700,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et at, as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body or bodies. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 m$^2$/g, in some embodiments from about 0.5 to about 5.0 m$^2$/g, and in some embodiments, from about 1.0 to about 2.0 m$^2$/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/cm$^3$, in some embodiments from about 0.2 to about 4.0 g/cm$^3$, and in some embodiments, from about 0.5 to about 3.0 g/cm$^3$.

To facilitate the construction of the anode body or bodies, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, polyethyloxazoline, etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

Figure 1:
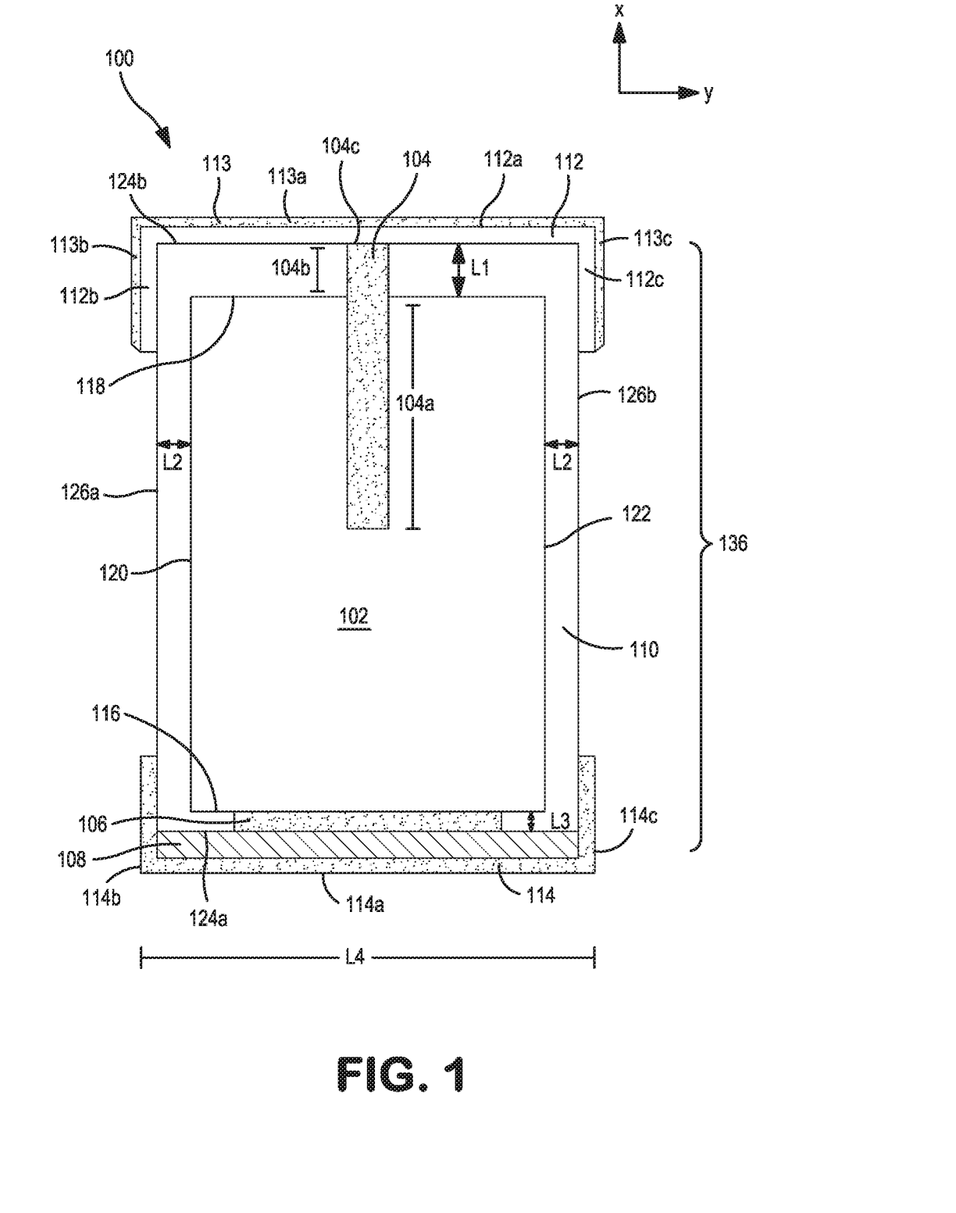
FIG. 1 is a cross-sectional view of one embodiment of the solid electrolytic capacitor of the present invention.

Regardless of its particular composition, the powder can be compacted around an anode lead so that at least a portion of the anode lead extends from the compacted porous anode body in a longitudinal direction. It should be further appreciated that the anode lead may alternatively be attached (e.g., welded) to the anode body subsequent to pressing and/or sintering of the anode body. The anode lead may be in the form of a wire, tape, ribbon, etc., and may be formed from a valve metal compound, such as tantalum, niobium, niobium oxide, etc. Referring to FIG. 1, for example, one embodiment is shown in which an anode lead 104 is embedded within a porous anode body (not labeled) and extends from a capacitor body 102 (including a porous anode body, a dielectric layer, and a cathode as are discussed in more detail below) at the upper surface 118 of the capacitor body 102. It should be understood, however, that the anode lead 104 may also extend from other surfaces of the capacitor body 102, such as side surface 120, side surface 122, lower surface 116 (so long as conductive adhesive 106 and metal plate 108, if included, are located in a different location from that shown in FIG. 1), a front surface (not shown) or a rear surface (not shown). A first portion of the anode lead 104a can be embedded within the porous anode body, while a second portion of the anode lead 104b can extend from the capacitor body 102 by a distance L1 in the longitudinal (x) direction to anode lead tip 104c. The distance L1 by which the anode lead 104b extends can correspond with the distance by which the exterior surface 124b of the insulating layer 110 extends from, for instance, the upper surface 118 of the capacitor body 102, and in some embodiments, the second portion of the anode lead 104b is substantially flush with the exterior surface 124b of the insulating layer 110 such that the tip of the anode lead 104c is substantially flush with the exterior surface 124b of the insulating layer and is free from contact with the insulating layer 110.

The anode lead 104 can possess any desired cross-sectional shape, such as circular, elliptical, square, rectangular, etc., and the diameter of the anode lead may generally vary depending on the overall size of the anode body. The ratio of the length of the anode lead in the longitudinal direction to the width (or diameter) of the lead ("aspect ratio") will vary in some embodiments from about 2 to about 150, in some embodiments from about 5 to about 100, and in other embodiments from about 15 to about 90. For example, the anode lead may have a width or diameter of from about 20 micrometers to about 1000 micrometers, in some embodiments from about 50 micrometers to about 800 micrometers, and in some embodiments from about 100 micrometers to about 600 micrometers. Using the widest range for the aspect ratio, this can correspond to the anode lead having a length of from about 40 micrometers to about 150 millimeters, in some embodiments from about 100 micrometers to about 120 millimeters, and in some embodiments from about 200 micrometers to about 90 millimeters.

As discussed above, the powder may be compacted around the anode lead, and this can be accomplished using any conventional powder press mold. For example, the press mold may be a single station compaction press using a die and one or multiple punches. Alternatively, anvil-type compaction press molds may be used that employ only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the anode lead may be embedded therein. The die may define a single slot or multiple slots that allow for the insertion of one or more anode leads. After filling the die with powder and embedding the anode lead(s) therein, the die cavity may then be closed and subjected to compressive forces by a punch. Typically, the compressive forces are exerted in a direction that is either generally parallel or generally perpendicular to the longitudinal axis "x" of the anode lead. This forces the particles into close contact with the anode lead and creates a strong anode lead-to-powder bond.

If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body can be sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

The height or thickness of the resulting porous anode body may be relatively thin, such as about 4 millimeters or less, in some embodiments, from about 0.05 millimeters to about 2 millimeters, in some embodiments, from about 0.1 millimeters to about 1 millimeter, and in some embodiments from about 0.2 millimeters to about 0.9 millimeters. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S.

Patent Application Publication No. 2005/0270725 to Hahn, at al., all of which are incorporated herein in their entirety by reference thereto for all purposes.

Once embedded with the anode lead and sintered, the anode body can be anodized so that a dielectric layer is formed over and/or within the anode body. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping the anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, an aqueous solvent (e.g., water) is can be used to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The anodized part may then be subjected to a step for forming a cathode that includes a solid electrolyte, such as a manganese dioxide, conductive polymer, etc. so that a capacitor body comprising the porous anode body, dielectric layer, and cathode is ultimately formed. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PERT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by Heraeus. CLEVIOS C is a commercially available catalyst for CLEVIOS M, which is 3,4-ethylene dioxythiophene, a PEDT monomer also sold by Heraeus. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., CLEVIOS C) may also be mixed with the material(s) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the solid electrolyte may be healed. Healing may occur after each application of a solid electrolyte layer or may occur after the application of the entire coating. In some embodiments, for example, the solid electrolyte may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 Volts and then dipped in sulfuric acid and applied with about 2 Volts. In this embodiment, the use of the second low voltage sulfuric acid solution or toluene sulfonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the capacitor body may optionally be applied with a carbon layer (e.g., graphite) and silver layer, respectively. The silver coating may, for instance, act as a solderable conductor, contact layer, and/or charge collector for the capacitor, while the carbon coating may limit contact of the silver coating with the solid electrolyte. Such coatings may cover some or all of the solid electrolyte.

Additionally, the capacitor or matrix of the present invention can include a metal plate (i.e., bottom lid) that is electrically connected to the solid electrolyte at a surface of the capacitor body, such as a lower surface when the anode lead extends from an upper surface. Although it is described herein that the metal plate is electrically connected to the solid electrolyte at a lower surface, it is to be understood that this electrical connection can be at any other surface of the porous anode body with the exception of the surface from which the anode lead extends. The metal plate can be formed of any suitable conductive material. For example, the metal plate can be formed from tantalum, copper or a nickel-iron alloy such as NILO®, or a combination thereof. In one embodiment, the metal plate can be a ferromagnetic material, such as a nickel-iron alloy, to aid in the production process, where an electromagnet is used to position the capacitor elements accurately. Moreover, without intending to be limited by any particular theory, it is believed that the metal plate can increase the surface smoothness of the capacitor element or matrix such that a better electrical connection to, for instance, a circuit board.

Further, the metal plate can have a small thickness to reduce the size of the electrolytic capacitor or assembly and/or to improve volumetric efficiency. For instance, the thickness of the metal plate may range from about 10 micrometers to about 1000 micrometers, in some embodiments from about 25 micrometers to about 500 micrometers, and in other embodiments from about 50 micrometers to about 200 micrometers. The metal plate can be electrically connected to the solid electrolyte using any technique known in the art, such as adhesive bonding, welding, etc. In one embodiment, for example, a conductive adhesive may be applied to the metal plate to electrically connect the metal plate to the solid electrolyte. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). In one particular embodiment, the conductive adhesive is a silver-loaded epoxy (SLE) adhesive. Other suitable conductive adhesives may be described in U.S. Patent Application Publication No. 2006/0038304 to Osako, et al., which is incorporated herein in its entirety by reference thereto for all purposes.

Regardless of whether a single electrolytic capacitor element is formed or a solid electrolytic capacitor assembly comprising a matrix of multiple capacitor elements is formed, an insulating material can be disposed around the one or more capacitor bodies to form an insulating layer, so long as the solid electrolyte and anode lead(s) remain(s) exposed to form an electrical connection with the metal plate and an anode termination (e.g., one or more conductive layers of titanium, chromium/nickel, nickel, silver, or a combination thereof)), respectively, as is discussed in more detail below. The insulating layer can surround the surface of the capacitor body or bodies from which the anode lead(s) extend(s) and the second portion(s) of the anode lead(s), so long as a part of each of the second portion(s) of the anode lead(s) remains exposed. The insulating layer can also surround any other exposed surfaces of the one or more capacitor bodies, such as those surfaces that are generally perpendicular from the surface from which the anode lead extends. Further, the insulating layer can surround a portion of the surface of the capacitor body to which the metal plate is attached via the conductive adhesive, although it is to be understood that least a portion of the metal plate must be in electrical contact with the solid electrolyte to from a sufficient electrical connection. In other words, the insulating layer should not surround the entire surface of the capacitor body at the cathode end of the capacitor element. The insulating layer can be formed from any suitable encapsulating resin such as a silica resin or an epoxy resin and can support and limit movement of the anode lead(s) to provide stability to the anode lead. In addition, the segments of the second portions of any anode leads extending beyond an exterior surface of the insulating layer can be trimmed so that the leads are substantially flush with the exterior surface of the insulating layer.

As indicated above, the solid electrolytic capacitor or solid electrolytic capacitor assembly of the present invention can include an anode termination to which any anode leads are electrically connected. When forming a single solid electrolytic capacitor, the anode termination can be of any dimension so long as it forms an electrical connection with the anode lead. In one embodiment, the anode termination may only contact the area of the capacitor element where the anode lead is exposed, while in another embodiment, the anode termination may also contact the exterior surface of the insulating layer that surrounds the anode lead. In one particular embodiment, the anode termination can be formed by electrodeposition plating under vacuum (i.e., chemical vapor deposition) with one or more conductive layers of chromium, nickel, silver, titanium, a chromium/nickel blend, or a combination thereof. In another embodiment, the anode termination may be in the form of a metal sheet formed from chromium, nickel, silver, titanium, a chromium/nickel blend, or a combination thereof that is connected to the exterior surface of the insulating layer that surrounds the anode lead and then folded so that it is contact with additional exterior surfaces of the insulating layer, such one or more of the exterior surfaces of the insulating layer that are generally perpendicular to the direction in which the anode lead extends to facilitate attachment to a surface such as a circuit board via soldering or other means. Regardless of how it is formed, the anode termination can be further plated with a layer of silver, a layer of nickel, a layer of tin, or a combination thereof via electrodeposition.

Further, the metal plate discussed above can serve as the cathode termination and can be of any dimension so long as it forms an electrical connection with the solid electrolyte, which, in some embodiments, may be via a conductive adhesive. In one embodiment, a layer of silver, a layer of nickel, a layer of tin, or a combination thereof may be plated directly onto the metal plate via electrodeposition to complete the formation of the cathode termination, where such layers can generally contact the entire length of metal plate, and may also be in contact with one or more of the exterior surfaces of the of the insulating layer. In another embodiment, the cathode termination can be formed by electrodeposition plating under vacuum with one or more conductive layers of chromium, nickel, silver, titanium, a chromium/nickel blend, or a combination thereof applied to the metal plate. In still another embodiment, the cathode termination may be separate from the metal plate and in the form of a metal sheet formed from chromium, nickel, silver, titanium, a chromium/nickel blend, or a combination thereof that is connected to the metal plate. Such a cathode termination can generally contact the entire length of metal plate, and may also be folded so that it is contact with one or more of the exterior surfaces of the of the insulating layer. For instance, the cathode termination may be folded so that it is in contact with one or more of the exterior surfaces of the insulating layer that are generally perpendicular to the surface of the capacitor body to which the metal plate and/or conductive adhesive is electrically connected to the solid electrolyte. Such an arrangement can facilitate attachment to a surface such as a circuit board via soldering or other means.

Further, the solid electrolytic capacitor assembly comprising a matrix of multiple capacitor elements can also include an anode termination to which the anode leads of the capacitor elements are electrically connected and a cathode termination to which the cathodes of the capacitor elements are electrically connected, as described above. When forming a solid electrolytic capacitor assembly comprising a matrix of multiple solid electrolytic capacitor elements, the anode termination can be of any dimension so long as it forms an electrical connection with each of the anode leads in the assembly, which have been trimmed or cut so that they are substantially flush with an exterior surface of the insulating layer. Generally, it is only required that the anode termination contact the area of the capacitor elements where the second portion of anode leads are exposed. However, the anode termination may also contact the exterior surface of the insulating layer that surrounds the anode leads. The anode termination may also contact additional exterior surfaces of the insulating layer, such one or more of the exterior surfaces of the insulating layer that are generally perpendicular to the direction in which the anode leads extend to facilitate attachment to a surface such as a circuit board. Further, the cathode termination can be of any dimension so long as it forms an electrical connection with the solid electrolyte, which, in some embodiments, may be via a conductive adhesive and metal plate. In one embodiment, the cathode termination may generally contact the entire length of the metal plate, and may also contact one or more of the exterior surfaces of the insulating layer. For instance, the cathode termination may be in contact with one or more of the exterior surfaces of the insulating layer that are generally perpendicular to the surfaces of the capacitor bodies to which the metal plate and/or conductive adhesive are connected to the solid electrolyte. Such an arrangement can facilitate attachment to a surface such as a circuit board via soldering or other means.

Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 10 micrometers to about 1000 micrometers, in some embodiments from about 50 micrometers to about 500 micrometers, and in other embodiments from about 75 micrometers to about 200 micrometers. One exemplary conductive material is a copper-iron alloy metal plate available from Wieland (Germany). If desired, as mentioned above, the surface of the terminations may be electroplated with nickel, silver, tin, etc. to ensure that the final part is mountable to the circuit board. In one particular embodiment, the surfaces of the terminations are plated with nickel and silver, while the mounting surface is also plated with a tin solder layer.

If in sheet form, the terminations may be connected using any technique known in the art, such as by welding, adhesive bonding, etc. In one embodiment, for example, a conductive adhesive may initially be applied to a surface of the anode and/or cathode terminations. Like the conductive adhesive that may be used to electrically connect the metal plate to the solid electrolyte of the capacitor body discussed above, the conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). In one embodiment, the conductive adhesive can be a silver loaded epoxy (SLE). Suitable conductive adhesives may be described in U.S. Patent Application Publication No. 2006/0038304 to Osako, et al., which is incorporated herein in its entirety by reference thereto for all purposes.

Generally speaking, it is desirable to electrically isolate the anode termination from the cathode termination so that the capacitor functions in the desired manner. To achieve such isolation, a variety of techniques may be implemented. In one embodiment, for instance, any oxide and/or cathode layer(s) formed on the lead may simply be removed through an etching process (e.g., chemical, laser, etc.). Likewise, a protective coating may also be formed on the anodized porous body and/or the anode lead, either prior to or after anodization, to protect it from contact with the solid electrolyte.

Figure 4:
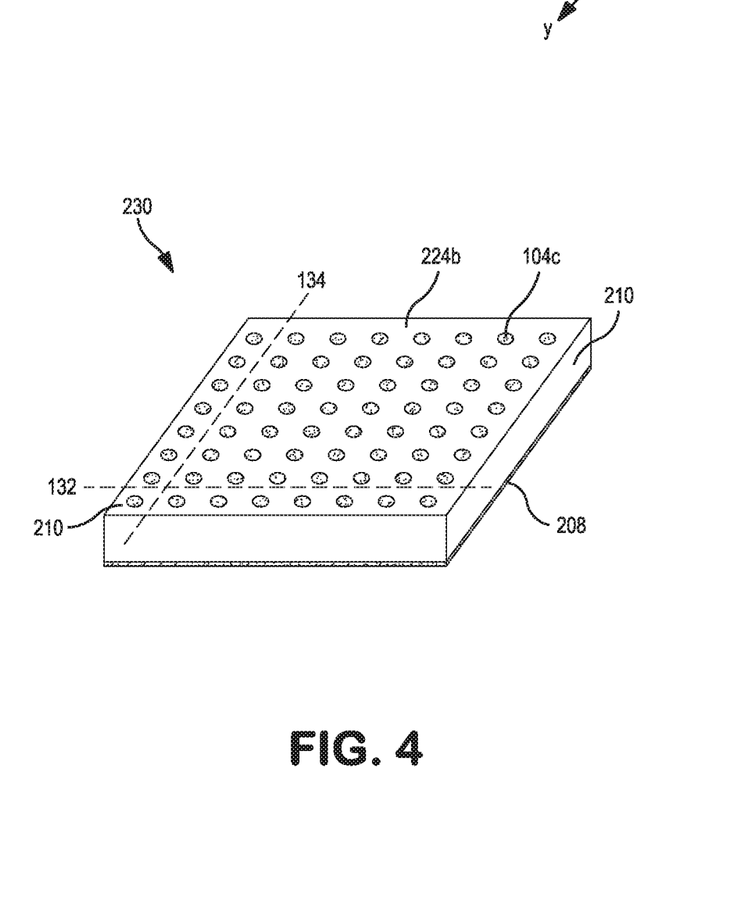
FIG. 4 is a perspective view of a matrix comprising multiple solid electrolytic capacitor elements via the method of the present invention.

When forming a single solid electrolytic capacitor, once the anode termination is connected to the anode lead and the cathode termination is connected to the solid electrolyte, the overall height (x-direction), width (y-direction) and length (z-direction) of the solid electrolytic capacitor using the axes shown in FIGS. 1 and 4 may vary depending on the intended application. Generally, however, the height of the capacitor in the x-direction, which is the direction in which the anode lead extends, can be less than about 3.5 millimeters, and can range from about 0.25 millimeters to about 3.5 millimeters, such as from about 0.5 millimeters to about 3 millimeters, such as from about 0.75 millimeters to about 2.5 millimeters, such as from about 1 millimeter to about 2 millimeters. Meanwhile, the width of the capacitor in the y-direction can be less than about 3 millimeters, and can range from about 0.25 millimeters to about 3 millimeters, such as from about 0.5 millimeters to about 2.75 millimeters, such as from about 0.75 millimeters to about 2.25 millimeters, such as from about 1 millimeter to about 2.5 millimeters. Further, the length of the capacitor in the z-direction can be less than about 2 millimeters, and can range from about 0.25 millimeters to about 2 millimeters, such as from about 0.30 millimeters to about 1.75 millimeters, such as from about 0.4 millimeters to about 1.5 millimeters, such as from about 0.5 millimeters to about 1 millimeter. Further, the resulting capacitor can have a volumetric efficiency of greater than about 30%, such as from about 30% to about 60%, such as from about 35% to about 55%, such as from about 40% to about 50% based on the following formula: Volumetric Efficiency=(Volume of Capacitor)/(Volume of Case)*100.

In addition, the solid electrolytic capacitor can have a capacitance ranging from about 25 microfarads to 500 microfarads, such as from about 40 microfarads to about 400 microfarads, such as from about 45 microfarads to about 300 microfarads. Meanwhile, the solid electrolytic capacitor can have an equivalent series resistance (ESR) less than about 200 milliohms, such as from about 1 milliohm to about 150 milliohms, such as from about 10 milliohms to about 125 milliohms, such as from about 25 milliohms to about 100 milliohms.

Figure 2:
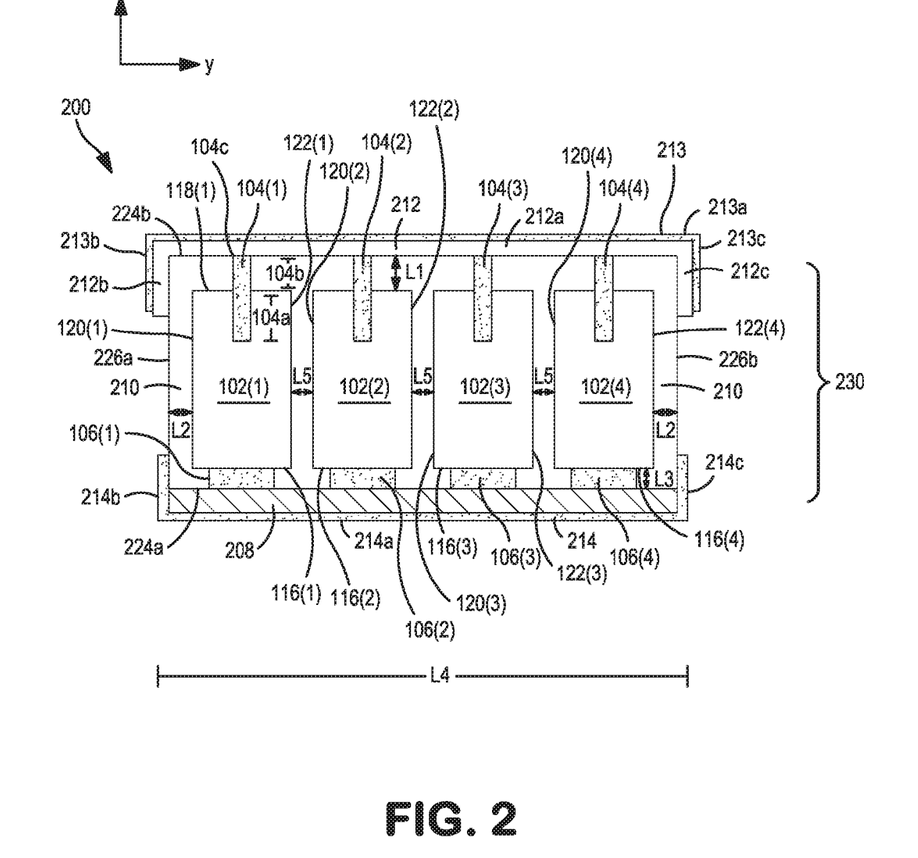
FIG. 2 is a cross-sectional view of one embodiment of the solid electrolytic capacitor assembly of the present invention.

Likewise, when forming a solid electrolytic capacitor assembly from a matrix of multiple solid electrolytic capacitor elements, the overall height (x-direction), width (y-direction) and length (z-direction) of the assembly using the axes shown in FIGS. 2 and 4 may vary depending on the intended application. Generally, however, the height of the solid electrolytic capacitor assembly in the x-direction, which is the direction in which the anode leads extend, can be less than about 3.5 millimeters, and can range from about 0.25 millimeter to about 3.5 millimeters, such as from about 0.5 millimeters to about 3 millimeters, such as from about 0.75 millimeters to about 2.5 millimeters, such as from about 1 millimeter to about 2 millimeters. Meanwhile, the width of the solid electrolytic capacitor assembly in the y-direction can range from about 0.5 millimeters to about 40 millimeters, such as from about 2 millimeters to about 35 millimeters, such as from about 5 millimeters to about 30 millimeters. Further, the length of the solid electrolytic capacitor assembly in the z-direction can range from about 0.5 millimeters to about 40 millimeters, such as from about 2 millimeters to about 35 millimeters, such as from about 5 millimeters to about 30 millimeters.

Of course, the dimensions of the electrolytic capacitor assembly depend on the number of individual solid electrolytic capacitor elements in the matrix. The matrix used in forming the solid electrolytic capacitor assembly can include at least 2 capacitor elements, such as from about 4 to about 144 capacitor elements, such as from about 8 to about 121 capacitor elements, such as from about 16 to about 100 capacitor elements. In this regard, the solid electrolytic capacitor assembly can be used in applications where a high capacitance and low equivalent series resistance (ESR) is required, such as in the use of solid state drives (SSDs) or in subscriber identity module (SIM) cards. For instance, the solid electrolytic capacitor assembly can have a capacitance of greater than about 500 microfarads, such as greater than 1000 microfarads, such as from about 1200 microfarads to about 2400 microfarads, such as from about 1400 microfarads to about 2200 microfarads, such as from about 1600 microfarads to about 2000 microfarads. Meanwhile, the ESR can be less than about 6 milliohms, such as from about 0.5 milliohms to about 5 milliohms, such as from about 1 milliohm to about 4.5 milliohms, such as from about 1.5 milliohms to about 4 milliohms.

The figures illustrating the various embodiments of the present invention will now be discussed in more detail. Referring now to FIG. 1, a cross sectional view of one particular embodiment of a solid electrolytic capacitor 100 is shown that includes an anode termination 112 (e.g., one or more conductive layers of titanium, chromium/nickel, nickel, silver, or a combination thereof), an anode termination plating layer 113 (e.g., one or more silver, nickel, or tin layers, or a combination thereof, such as a nickel/tin layer), a metal plate 108 that serves as the cathode termination, and a cathode termination plating layer 114 (e.g., one or more silver, nickel, or tin layers, or a combination thereof, such as a nickel/tin layer) in electrical connection with a capacitor element 136, where the capacitor element 136 includes a capacitor body 102 and an anode lead 104, where the capacitor body 102 is connected via a conductive adhesive 106 to the metal plate 108. The capacitor body 102 includes a porous anode body, dielectric layer, and a cathode layer (not shown).

Turning now to the specific components of the solid electrolytic capacitor 100, the capacitor body 102 is defined by a lower surface 116, an upper surface 118, a first side surface 120, and a second side surface 122. The lower surface 116 is electrically connected to a metal plate 108 via a conductive adhesive 106, which can be silver-loaded epoxy or any other suitable conductive adhesive. Although the conductive adhesive 106 is shown in FIG. 1 as not extending the entire length L4 of the metal plate 108, it should be understand that in some embodiments, the conductive adhesive can extend the entire length L4. At the opposing upper surface 118, a first portion 104a of anode lead 104 is embedded in the porous anode body 102 and a second portion 104b extends from the upper surface 118 of the porous anode body 102 in the x-direction for a distance L1 to the anode lead tip 104c. The distance L1 corresponds with the distance that the insulating layer 110 extends past the upper surface 118 of the capacitor body 102 to define upper exterior surface 124b of the insulating layer 110. Thus, the tip 104c of the second portion 104b of the anode lead 104 is substantially flush with the upper exterior surface 124b. Meanwhile, the insulating layer 110 extends for a distance L2 from each of the opposing side surfaces 120 and 122 of the capacitor 102 to define the exterior side surfaces 126a and 126b of the insulating layer 110. The insulating layer 110 also extends from the portion of the lower surface 116 of the capacitor body 102 that is not in contact with conductive adhesive 106 to the metal plate 108 for a distance L3 to define the exterior lower surface 124a of the insulating material 110.

Additionally, the anode termination 112 is shown in FIG. 1 as having three portions including 112a in the y-direction and 112b and 112c in the x-direction, although it should be understood that the anode termination 112 can include only portion 112a and that portion 112a need not extend the entire length of the upper exterior surface 124b of the insulating layer 110 so long as the anode termination 112 is in electrical contact with the anode lead tip 104c. Meanwhile, the plating layer 113, which can be disposed on the anode termination 112 as well as a portion of exterior side surfaces 126a and 126b (although not shown in FIG. 1, as FIG. 1 shows an anode termination having portions 112b and 112c) can also have multiple portions, including 113a in the y-direction and 113b and 113c in the x-direction. Further, the plating layer 114, which can be disposed on the metal plate 108 as well as a portion of exterior side surfaces 126a and 126b can also have multiple portions including 114a in the y-direction and 114b and 114c in the x-direction.

Referring now to FIG. 2, a cross-sectional view of one particular embodiment of a solid electrolytic capacitor assembly 200 is shown that includes an anode termination 212 (e.g., one or more conductive layers of titanium, chromium/nickel, nickel, silver, or a combination thereof), an anode termination plating layer 213 (one or more silver, nickel, or tin layers, or a combination thereof, such as a nickel/tin layer), a metal plate 208 that can serve as the cathode termination, and a cathode termination plating layer 214 (one or more silver, nickel, or tin layers, or a combination thereof, such as a nickel/tin layer) in electrical connection with a matrix of solid electrolytic capacitor elements 230, where the matrix 230 includes capacitor bodies 102(1), 102(2), 102(3), and 102(4) and anode leads 104(1), 104(2), 104(3), and 104(4), where the capacitor bodies 102(1), 102(2), 102(3), and 102(4) are connected to the metal plate 208 by sections of conductive adhesive 106(1), 106(2), 106(3), and 106(4). Each capacitor body 102 in the matrix 230 includes a porous anode body, a dielectric layer, and a cathode layer (not shown). For exemplary purposes, the solid electrolytic capacitor assembly 200 is discussed in reference to the capacitor body 102(1) in more detail, but it is to be understood that the following description also applies to the other capacitor bodies in the matrix 230.

Turning now to the specific components of the solid electrolytic capacitor assembly 200, the capacitor body 102(1) is defined by a lower surface 116(1), an upper surface 118(1), a first side surface 120(1) and a second side surface 122(1). The lower surface 116(1) is electrically connected to a metal plate 208 via a section of conductive adhesive 106(1), which can be silver-loaded epoxy or any other suitable conductive adhesive. It should be pointed out that capacitor bodies 102(2), 102(3), and 102(4) are also connected to the same metal plate 208 via sections of conductive adhesive 106(2), 106(3), and 106(4), respectively. Further, although FIG. 2 shows that each capacitor body is connected to the metal plate 208 via a separate section of conductive adhesive at lower surfaces 116(1), 116(2), 116(3), and 116(4), the conductive adhesive can extend the entire length L4 of the metal plate 208 if desired. Meanwhile, at the opposing upper surface 118(1) of capacitor body 102(1), a first portion 104a of anode lead 104(1) is embedded in the porous anode body 102(1) and a second portion 104b extends from the upper surface 118(1) of the capacitor body 102(1) in the x-direction for a distance L1 to anode lead tip 104c. The distance L1 corresponds with the distance that the insulating layer 210 extends from the upper surface 118(1) of the capacitor body 102(1), as well as from the amount of insulating layer 210 extending from the upper surfaces of the additional capacitor bodies 102(2), 102(3), and 102(4), to define upper exterior surface 224b of the insulating layer 110. Thus, for example, the tip 104c of the second portion 104b of the anode lead 104(1) is substantially flush with the upper exterior surface 224b, as are the second portions of the additional anode leads 104(2), 104(3), and 104(4).

Additionally, the insulating layer 210 extends for a distance L2 from the outermost opposing side surfaces 120(1) and 122(4) of the capacitor bodies 102(1) and 102(4) respectively to define the side exterior surfaces 226a and 226b of the insulating layer 210. The insulating layer 210 also extends from the portion of the lower surfaces 116(1), 116(2), 116(3), and 116(4) of the capacitor bodies 102(1), 102(2), 102(3), and 102(4) that are not in contact with the sections of conductive adhesive 106(1), 106(2), 106(3), and 106(4) to the metal plate 208 for a distance L3 to define the exterior lower surface 224a of the insulating material 210. Meanwhile, the insulating layer 210 is also disposed between the various capacitor bodies. For example, the insulating layer 210 can fill the space between the side surface 122(1) of capacitor body 102(1) and the side surface 120(2) of capacitor body 102(2) as defined by distance L5, between the side surface 122(2) of capacitor body 102(2) and the side surface 120(3) of capacitor body 102(3) also as defined by a distance L5, and between the side surface 122(3) of capacitor body 102(3) and side surface 120(4) of capacitor body 102(4) also as defined by a distance L5.

Furthermore, the anode termination 212 is shown in FIG. 2 as having multiple portions including 212a in the y-direction and 212b and 212c in the x-direction, although it should be understood that the anode termination 212 can include only portion 212a and that portion 212a need not extend the entire length of the upper exterior surface 224b of the insulating layer 210 so long as the anode termination 212 is in electrical contact with the tip 104c of anode leads 104(1), 104(2), 104(3), and 104(4). Meanwhile, plating layer 213 disposed on the anode termination 212 is also shown as having multiple portions, including 213a in the y-direction and 213b and 213c in the x-direction. The plating layer 214 disposed on the metal plate 208 is also shown as having multiple portions including 214a in the y-direction and 214b and 214c in the x-direction.

Figure 3:
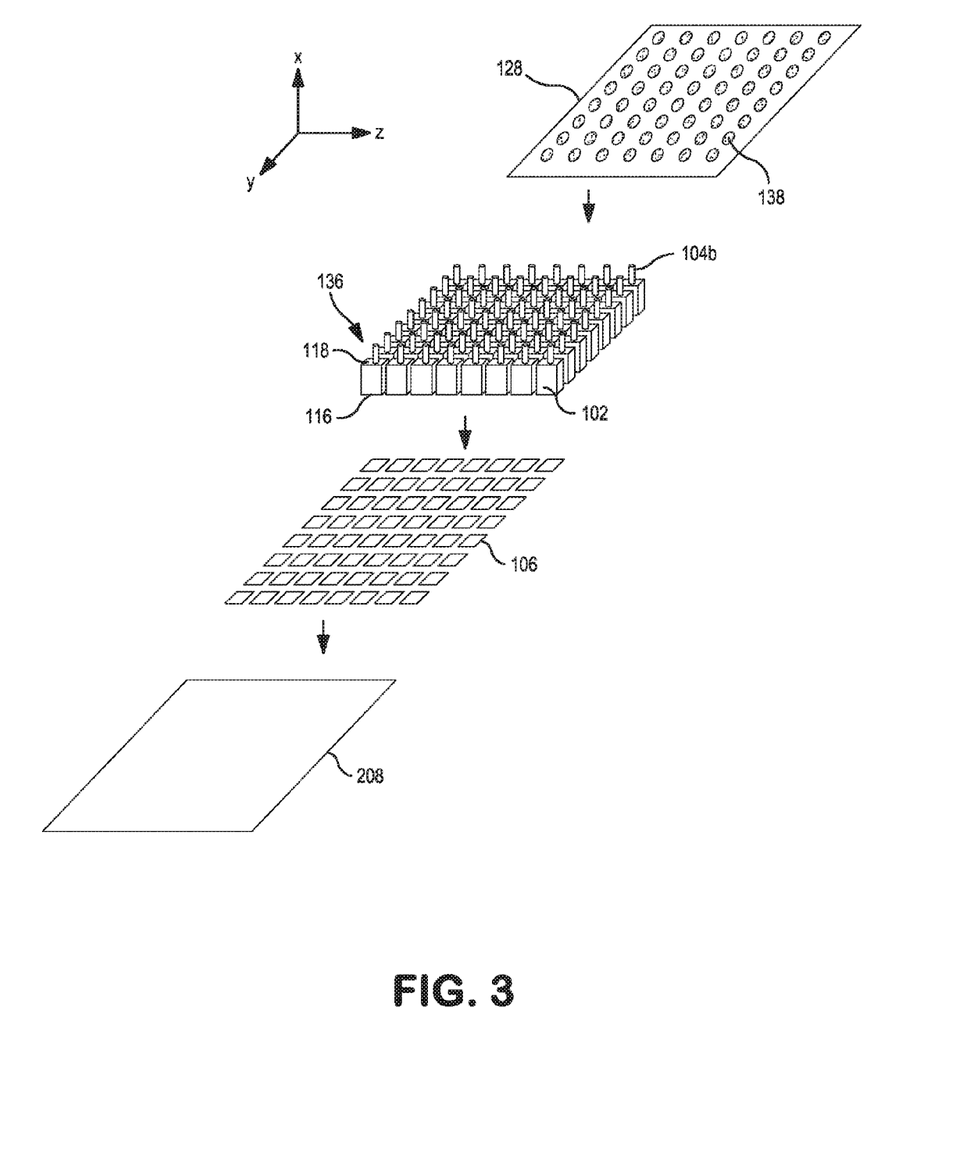
FIG. 3 is an exploded view showing various components utilized in forming a matrix comprising multiple solid electrolytic capacitor elements via the method of the present invention.

A method of making the solid electrolytic capacitor 100 and solid electrolytic capacitor assembly 200 of FIGS. 1 and 2 respectively from a matrix of capacitor elements is discussed in more detail in reference to FIGS. 3-6. First, as shown in FIG. 3, a section of conductive adhesive 106 is dispensed onto the metal plate 208. Then, the lower surfaces 116 of the capacitor bodies 102 are placed onto the metal plate 208 and are positioned so that each capacitor body 102 rests on a separate section of the conductive adhesive 106. Next, as is shown in FIG. 3, a covering material (i.e., top lid) 128 is provided for holding multiple capacitor elements 136 in place via the openings 138 in the covering material 128. The second portions 104b of the anode leads 104 are then inserted into the openings 138 of the covering material 128 so that the covering material 128 rests on the upper surfaces 118 of each of the capacitor bodies 102. Thereafter, the porous capacitor bodies 102 are clamped cured to the metal plate 208 via pressure applied between the metal plate 208 and covering material 128. Next, the covering material 128 is removed.

Turning now to FIG. 4, an insulating material can be used to fill the spaces between the multiple capacitor bodies 102 (not visible) with an insulating layer 210. The insulating material 210 can completely encapsulate the portions of the multiple capacitor bodies 102 that are not already connected to the metal plate 208 via conductive adhesive 106 so that no surfaces of the capacitor bodies 102 are exposed, and the insulating material 210 extends a distance L1 above the upper surfaces of the capacitor bodies 102 in the x-direction as discussed above in reference to FIG. 2. A portion of each of the second portion 104b of each of the anode leads 104 extends above the insulating layer 210 in the x-direction (not shown), and a grinding or cutting tool, or any other suitable tool or method, is used to trim or remove the second portion 104b of each the anode leads 104 that extends above the insulting material 210 so that the tips 104c of the second portions 104b of the anode leads 104 are substantially flush with an exterior surface 224b of the insulating layer 210. This results in the formation of the matrix of solid electrolytic capacitor elements 230 that is shown in FIG. 4, on which one or more conductive layers of titanium, chromium/nickel, nickel, silver, or a combination thereof can be deposited to form anode termination 212.

Figure 5:
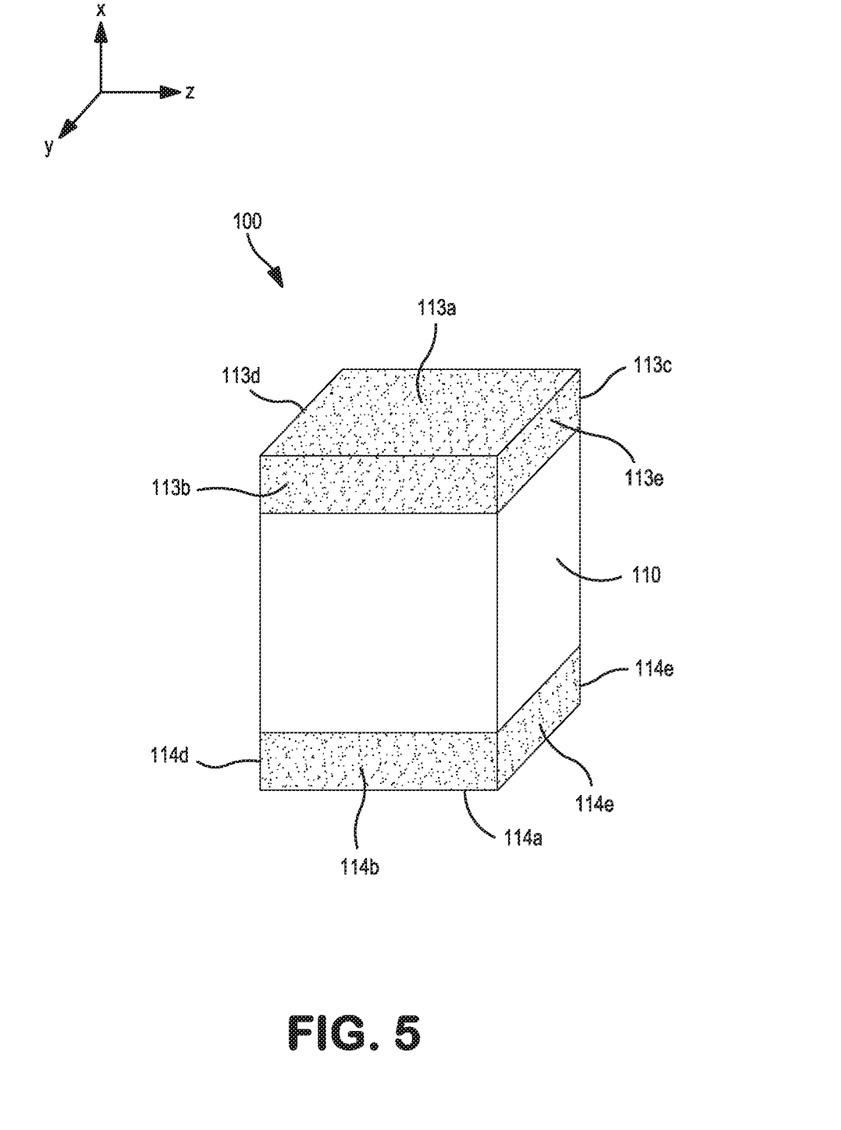
FIG. 5 is a perspective view of the solid electrolytic capacitor of the present invention.
Figure 6:
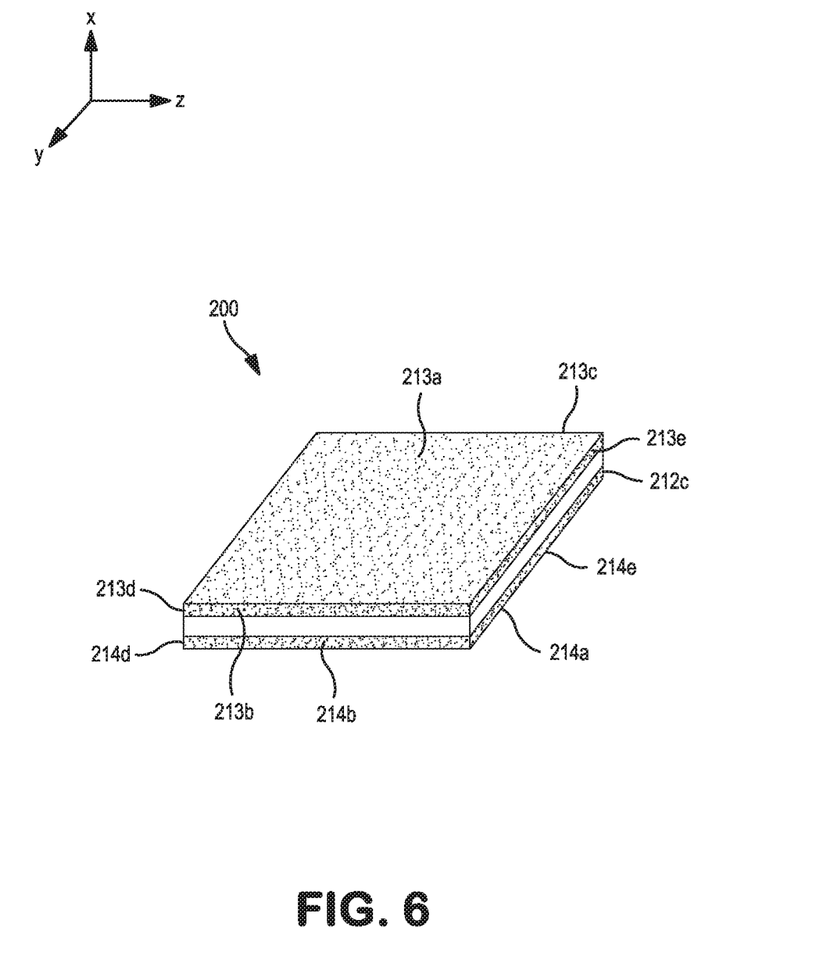
FIG. 6 is a perspective view of the solid electrolytic capacitor assembly of the present invention.

At this point, the matrix of solid electrolytic capacitor elements 230 can be cut in the z-direction along line 132, in the y-direction along line 134 and in lines parallel to lines 132 and 134 to form numerous solid electrolytic capacitor elements 136. Then, each of the solid electrolytic capacitor elements 136 can be plated with one or more silver, nickel, or tin layers, or a combination thereof, as discussed above to form a solid electrolytic capacitor 100, as shown in FIG. 5. The anode termination 112 end of the capacitor 100 can include a plating layer having portions 113a, 113b, 113c, 113d, and 113e as shown, while the metal plate 108 end of the capacitor 100 can include a plating layer having portions 114a, 114b, 114c, 114d, and 114e as shown.

In the alternative, the matrix of solid electrolytic capacitor elements 230 can be left uncut so that an electrolytic capacitor assembly 200 can be formed. Then the matrix 230, which includes multiple capacitor bodies 102 (not shown) and anode leads 104 (not shown) can be plated with one or more silver, nickel, or tin layers as discussed above, resulting in the multiple solid electrolytic capacitor assembly 200 shown in FIG. 6. The anode termination 212 end of the capacitor assembly 200 can include a plating layer having portions 213a, 213b, 213c, 213d, and 213e as shown, while the metal plate 108 end of the capacitor assembly 200 can include a plating layer having portions 214a, 214b, 214c, 214d, and 214e as shown.

The present invention may be better understood by reference to the following examples.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads with 0.0 volts DC bias and a 1.0 volt peak to peak sinusoidal signal, at an operating frequency of 100 kHz and temperature of 23° C.±2° C.

Capacitance ("Cap") and Dissipation Factor ("Df")

The capacitance and dissipation factor were measured using a Keithley 3330 Precision LCZ meter with Kelvin Leads with 2.0 volts DC bias and a 1.0 volt peak to peak sinusoidal signal. The operating frequency was 120 Hz and the temperature was 23° C. 4.2° C.

Leakage Current ("DCL")

Leakage current was measured using a leakage test set that measures leakage current at a temperature of 23° C.±2° C. and at the rated voltage after a minimum of 60 seconds.

Example 1

A capacitor was constructed in accordance with the present invention as described above. Specifically, a capacitor was constructed having an H case size and performance parameters of about 220 µF and 6.3 Volts. Anodes were pressed on side presses from STA150KA tantalum powder manufactured by H.C. Starck (rated with a specific charge of about 150,000 µF*V/g). The resulting anode had a height in the x-direction of about 3.00 millimeters (mm), a width in the y-direction of about 2.4 mm, and a length in the z-direction of about 0.85 mm with a 0.24 mm diameter anode lead wire positioned in the center of the anode and extending in the x-direction. A dielectric layer was formed over the anode by a conventional anodic oxidation process, over which a conductive polymer (PELT), graphite and silver coatings were applied to form the cathode layer. The resulting capacitor elements were inserted into the grid and holes of the top lid (i.e., covering material), which was made of Alloy 42 NILO base material. Silver loaded epoxy (Protavic ACE10131) was applied on the base portions of the cathode terminations to ensure good contact between the silvered capacitor portion and the bottom lid (i.e., metal plate), which was also made of Alloy 42 NILO base material plated by nickel and silver. Attachment of the multiple capacitor elements to the bottom lid (i.e., metal plate) was achieved with application of a cured silver loaded epoxy adhesive to attach the cathode layer of the capacitor element to the metal plate. The conductive adhesive was cured at a temperature of 180° C. for about 120 minutes. The top lid (i.e., covering material) was removed and the bottom lid (i.e., metal plate) now connected to multiple capacitor elements was encapsulated with a Stycast/Henkel 2651 yellow colored mold. The top side (e.g., upper surface) of the encapsulated insulating layer was grinded off to expose the anode lead wires of the multiple capacitor elements. The top side with bare wires was plated under vacuum with multiple conductive layers (titanium, chromium/nickel, nickel, and silver) to form a solderable contact for the anode side of the capacitor elements. Grooved channels between each of the individual capacitors were cut through to form the separated capacitor parts. Afterwards, harperising, tin plating on the anode termination and to form the cathode termination overtop the bottom lid, conventional reflow, and ageing were carried out on each of the capacitors, after which point various electrical properties were tested on multiple parts (200 pcs). The results are set forth below in Table 1 (median of measured values) and compared.

In order to provide a relative comparison of the above volumetric efficiency, the volumetric efficiency of a standard tantalum capacitor using prior art construction techniques to create a capacitor with the same overall case size is calculated. In accordance with such standard techniques, the maximum capacitor element portion for Example 1 would be characterized by dimensions of about 0.85 mm in height, 2.40 mm in width and 3.00 mm in length, thus having a resultant volumetric size of about 6.12 mm$^3$. This results in a volumetric efficiency of about 43%. In a similar H case size, the volumetric size for a standard capacitor element portion is about 4.28 mm$^3$. As such, the capacitor of Example 1 constructed in accordance with aspects of the present invention achieves approximately a 40% increase in capacitance compared to standard electrolytic capacitors, which can be attributed to the increased volumetric efficiency (capacitor element volume of 6.12 mm³ compared to just 4.28 mm³ for the comparative capacitor element).

TABLE 1

|  | CAP [μF] | Df | ESR [mΩ] | DCL [υA] |
|---|---|---|---|---|
| Ex. 1 | 227.0 | 0.031 | 68.6 | 8.25 |
| Comparative | 138.8 | 0.024 | 61.8 | 6.51 |

Example 2

A capacitor was constructed in accordance with the present invention as described above. Specifically, a capacitor was constructed having a M case size and performance parameters of about 47 μF and 10 Volts. Anodes were pressed on side presses from STA200KA tantalum powder manufactured by H.C. Starck (rated with a specific charge of about 200,000 μF*V/g). Anode dimensions correspond to height in the x-direction of about 1.50 mm, a width in the y-direction of about 1.05 mm, and a length in the z-direction of about 0.60 mm with a 0.17 mm diameter anode lead wire positioned in the center of the anode and extending in the x-direction. A dielectric layer was formed over the anode by a conventional anodic oxidation process, over which a MnO₂, graphite and silver coatings were applied to form the cathode layer. Capacitor elements were inserted into the grid and holes of the top lid (i.e., covering material) which were made of Alloy 42 NILO base material. Silver loaded epoxy (Protavic ACE10131) was applied on the base portions of the cathode terminations to ensure good contact between silvered capacitor portion and the bottom lid (i.e., metal plate), which were also made of Alloy 42 NILO base material plated by nickel and silver. Attachment of the multiple capacitor elements to the bottom lid (i.e., metal plate) were achieved by cured silver loaded epoxy adhesive to attach the cathode layer of the capacitor element to the cathode termination. The conductive adhesive was cured at a temperature of 180° C. for about 120 minutes. The top lid (i.e., covering material) was removed and the bottom lid (i.e., metal plate) now connected to multiple capacitor elements was encapsulated with a Stycast/Henkel 2651 yellow colored mold. The top side (e.g., upper surface) of the encapsulated insulating layer was grinded off to expose the anode lead wires of the multiple capacitor elements. The top side with bare wires was plated under vacuum with multiple conductive layers (titanium, chromium/nickel, nickel, and silver) to form a solderable contact for the anode side of the capacitor elements. Grooved channels between each of the individual capacitors were cut through to form the separated capacitor parts. Afterwards, harperising, tin plating on the terminations, conventional reflow, and ageing were carried out on the capacitors, after which point various electrical properties were tested on multiple parts (940 pcs). The results are set forth below in Table 2 (median of measured values) and compared.

In order to provide a relative comparison of the above volumetric efficiency, the volumetric efficiency of a standard tantalum capacitor using prior art construction techniques to create a capacitor with the same overall case size is calculated. In accordance with such standard techniques, the maximum capacitor element portion would be characterized by dimensions of about 0.60 mm in length in the z-direction, 1.05 mm in width in the y-direction, and 1.50 mm in height in the x-direction, which is the direction in which the anode lead extends, thus having a resultant volumetric size of about 0,945 mm³. This results in a volumetric efficiency of about 43%. In a similar M case size, the volumetric size for a standard capacitor element portion is about 0,629 mm³. As such, the capacitor of Example 1 constructed in accordance with aspects of the present invention achieves approximately a 50% increase in capacitance compared to standard electrolytic capacitors, which can be attributed to the increased volumetric efficiency (capacitor element volume of 0.945 mm³ compared to just 0.629 mm³ for a comparative capacitor element).

TABLE 2

|  | CAP [μF] | Df | ESR [Ω] | DCL [υA] |
|---|---|---|---|---|
| Ex. 2 | 50.6 | 0.25 | 3.52 | 0.89 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
   a capacitor body comprising a sintered, porous anode body, a dielectric layer overlying at least a portion of the porous anode body, and a cathode overlying at least a portion of the dielectric layer, the cathode including a solid electrolyte;
   a metal plate that is electrically connected to the solid electrolyte via a conductive adhesive at a first surface of the capacitor body, wherein the metal plate exists in a single plane and is parallel to the first surface of the capacitor body;
   an anode lead, wherein a first portion of the anode lead is embedded within the porous anode body and a second portion of the anode lead extends from an opposing second surface of the capacitor body in a longitudinal direction; and
   an insulating layer that surrounds the capacitor body and the second portion of the anode lead, wherein a tip of the second portion of the anode lead is substantially flush with a first exterior surface of the insulating layer, wherein one or more conductive layers is in direct contact with the tip of the second portion of the anode lead, further wherein the one or more conductive layers is also in direct contact with the first exterior surface of the insulating layer, wherein the conductive adhesive is present only at the first surface of the capacitor body, wherein a portion of the first surface of the capacitor body is not in contact with the conductive adhesive, further wherein the insulating layer is disposed between the portion of the first surface of the capacitor body that is not in contact with the conductive adhesive and the metal plate.

2. The solid electrolytic capacitor of claim 1, wherein the porous anode body includes tantalum, niobium, or an electrically conductive oxide thereof.

3. The solid electrolytic capacitor of claim 1, wherein the metal plate comprises a ferromagnetic material.

4. The solid electrolytic capacitor of claim 1, wherein the anode lead is a wire.

5. The solid electrolytic capacitor of claim 1, wherein the insulating layer comprises an encapsulating resin.

6. The solid electrolytic capacitor of claim 1, wherein the tip of the second portion of the anode lead is free from contact with the insulating layer.

7. The solid electrolytic capacitor of claim 1, wherein the solid electrolyte includes manganese dioxide or a conductive polymer.

8. A solid electrolytic capacitor assembly that comprises a matrix of multiple solid electrolytic capacitor elements, each of the multiple solid electrolytic capacitor elements comprising:
  a capacitor body having a first surface and an opposing second surface and comprising a sintered, porous anode body, a dielectric layer overlying at least a portion of the porous anode body, and a cathode overlying at least a portion of the dielectric layer, the cathode including a solid electrolyte, wherein a metal plate is electrically connected to the solid electrolyte at the first surface of each capacitor body via a conductive adhesive, wherein the metal plate exists in a single plane and is parallel to the first surface of each capacitor body;
  an anode lead, wherein a first portion of the anode lead is embedded within the porous anode body and a second portion of the anode lead extends from the second surface of the capacitor body in a longitudinal direction; and
  an insulating layer that surrounds each capacitor body and the second portion of each anode lead, wherein a tip of the second portion of the anode lead is substantially flush with a first exterior surface of the insulating layer, wherein one or more conductive layers is in direct contact with the tip of the second portion of each anode lead, further wherein the one or more conductive layers is also in direct contact with the first exterior surface of the insulating layer, wherein the conductive adhesive is present Daly at the first surface of the capacitor body, wherein a portion of the first surface of the capacitor body is not in contact with the conductive adhesive, further wherein the insulating layer is disposed between the portion of the first surface of the capacitor body that is not in contact with the conductive adhesive and the metal plate.

9. The solid electrolytic capacitor assembly of claim 8, wherein the porous anode body includes tantalum, niobium, or an electrically conductive oxide thereof and the anode lead is a wire.

10. The solid electrolytic capacitor assembly of claim 8, wherein the tip of the second portion of each anode lead is free from contact with the insulating layer.

* * * * *